UNITED STATES PATENT OFFICE.

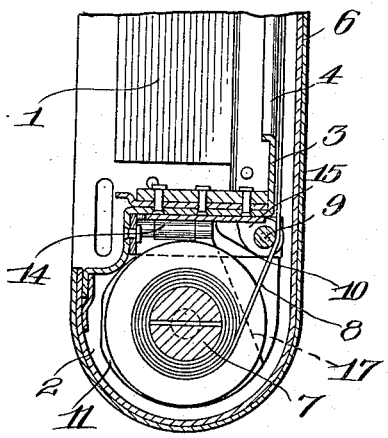
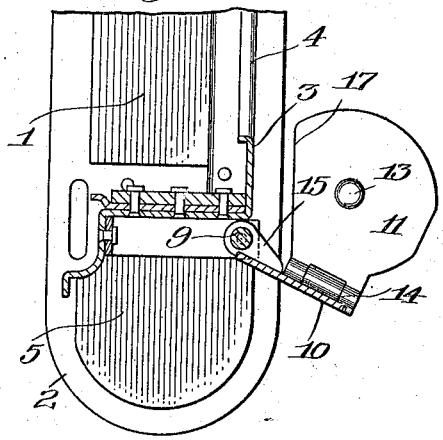
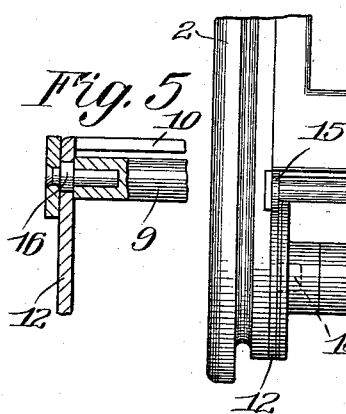
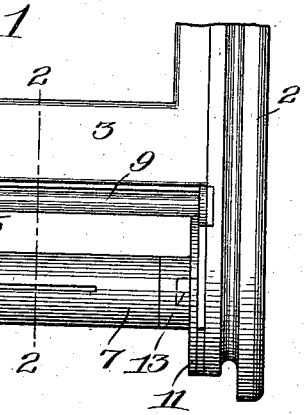
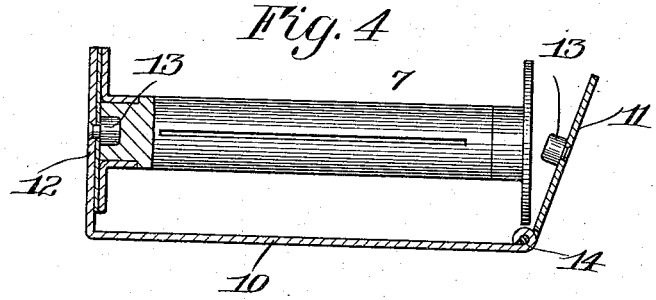

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

SPOOL-HOLDER FOR FILM-CAMERAS.

1,227,276.          Specification of Letters Patent.      Patented May 22, 1917.

Application filed January 3, 1916. Serial No. 69,710.

*To all whom it may concern:*

Be it known that I, ROBERT KROEDEL, of Rochester, in the county of Monroe and State of New York, have invented certain new and useful Improvements in Spool-Holders for Film-Cameras; and I do hereby declare the following to be a full, clear, and exact description of the same, reference being had to the accompanying drawings, forming a part of this specification, and to the reference numerals marked thereon.

My present invention relates to photography and more particularly to photographic film cameras and roll holders and it has for its object to provide a simple, cheap and efficient support for the film spool whereby the latter may be readily locked in operative position within the camera or holder or moved to a projecting accesssible position for the insertion or removal of the spools. The improvements are directed in part to the arrangements for engaging and releasing the spool centers and to movably mounting the holder in such manner that it does not result in a substantial increase in parts. To these and other ends the invention resides in certain improvements and combinations of parts all as will be hereinafter more fully described, the novel features being pointed out in the claims at the end of the specification.

In the drawings:

Figure 1 is a fragmentary rear view of the spool holding end of a pocket film camera constructed in accordance with and illustrating one embodiment of my invention, the camera back being removed;

Fig. 2 is a section taken substantially on the line 2—2 of Fig. 1 with the camera back in place and showing the film spool and film in operative position;

Fig. 3 is a similar section but with the back removed and showing the film holder swung out into position to receive a new spool;

Fig. 4 is a detail longitudinal sectional view through the film spool holder, the section being also taken partly through a spool in the holder; and Fig. 5 is an enlarged detail sectional view through one of the pivotal supports of the spool holders.

Similar reference numerals throughout the several figures indicate the same parts.

In the present embodiment of the invention, the camera comprises an exposure and bellows chamber 1 formed by the side pieces 2 and an inner frame 3, the opening 4 of which latter constitutes the exposure opening of the camera and defines the focal plane. The side pieces 2 are extended beyond the frame 3 to constitute the end walls of the film chamber 5, the inner wall of which is provided by the frame 3 that separates it from the exposure chamber 1. The other walls of the film chamber are provided by the camera back 6 which, when removed as in Figs. 1 and 3, opens the film chamber at the rear of the camera as well as at the end thereof.

The film spool 7 occupies the chamber 5 and the film 8 passing to or from it, is stretched in the focal plane of the camera in rear of the exposure opening 4, as shown in Fig. 2, and it travels over the usual film guide roller 9 arranged adjacent to the frame 3 between the axis of the spool and the exposure chamber. The spool is directly supported on a yoke-shaped holder 10 best shown in Fig. 4, and consisting, in the present instance, of a plate normally lying at the bottom of the film chamber 5 against the frame 3. Plates 11 and 12 forming the arms of the yoke lie parallel with and against the side pieces 2 of the chamber and are provided centrally with centers 13 that engage within the recesses in the ends of the film spool and define its axis of rotation. One of these arms or plates, in the present instance, the plate 11, is pivotally connected at 14 to the body of the holder 10. Normally, as in Figs. 1 and 2, it is held against the end or flange of the spool, so that its center 13 engages with the latter, by the ends of the film chamber but to release the spool it is swung outwardly as shown in Fig. 4, axially of the spool.

To permit this last mentioned movement, the holder 10 is itself swingingly mounted. In the present instance, it is provided with lugs 15 extended from the body thereof or with one lock extending from the plate 12 to coöperate with the pivots or pivot 16 on which the film guide roll 9, previously described, turns (see Fig. 5.) Thus, the holder may be swung rearwardly, as in Fig. 3, out of the film chamber to a position in rear of the camera and of the focal plane thereof, carrying the spool with it. Then, by displacing the plate 11 as in Fig.

4, its center 13 may be withdrawn from the spool to release the latter and the spool is easily removed whether empty or loaded with a roll of film. In order that the sides of the camera may not interfere with this swinging movement of the plate 11, the latter may be cut away at one side as shown at 17 in Fig. 3. When desired, a new spool may be inserted while the holder is in this position and the latter swung back to operative position carrying the spool within the chamber 5 as in Fig. 2.

In the present instance, the plates or arms 11 and 12 are coincident with the inner faces of the side pieces 2 with which the camera back 6 coöperates and thus the back by contact with the edges of the members 11 and 12, serves to retain the holder in operative position against movement on its pivot while the film is being manipulated.

I claim as my invention:

1. In a photographic camera, the combination with an exposure chamber having an exposure opening in the focal plane of the camera, and a film spool chamber at one side of the exposure chamber and forwardly of the focal plane, of a spool supporting member within the film spool chamber pivotally mounted to swing outwardly therefrom to a position in rear of the focal plane of the camera on an axis lying between the exposure chamber and the axis of the spool when the latter is in operative position.

2. In a photographic camera, the combination with a film chamber, of a film spool supporting member in the chamber comprising a plate having a spool center thereon, the member being pivotally mounted to swing out of the chamber on an axis parallel to that of a spool turning on the said center, and a displaceable back for the camera operating to close the film chamber and to maintain the spool supporting member in operative position therein by coöperating with the edges of the plate.

3. In a photographic camera comprising an exposure opening and a film spool chamber arranged adjacent thereto, the combination with a film guide arranged between the exposure opening and the film spool chamber, of a film spool support pivoted on the film guide to swing into and out of the chamber.

ROBERT KROEDEL.

Witnesses:
SOPHIA ECKERT,
EDITH WATERSTRAAT.

Copies of this patent may be obtained for five cents each, by addressing the "Commissioner of Patents, Washington, D. C."